United States Patent
Zhang (10) Patent No.: US 10,837,764 B2
(45) Date of Patent: Nov. 17, 2020

(54) SURFACE FLATNESS MEASURING DEVICE AND SURFACE FLATNESS MEASURING METHOD

(71) Applicant: Wuhan China Star Optoelectronics Technology Co., Ltd., Wuhan (CN)

(72) Inventor: Jinpeng Zhang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 55 days.

(21) Appl. No.: 16/323,783

(22) PCT Filed: Dec. 21, 2018

(86) PCT No.: PCT/CN2018/122620
§ 371 (c)(1),
(2) Date: Feb. 7, 2019

(87) PCT Pub. No.: WO2020/103262
PCT Pub. Date: May 28, 2020

(65) Prior Publication Data
US 2020/0200527 A1  Jun. 25, 2020

(30) Foreign Application Priority Data
Nov. 22, 2018 (CN) .......................... 2018 1 1395350

(51) Int. Cl.
*G01B 11/24* (2006.01)
*G01B 11/06* (2006.01)

(52) U.S. Cl.
CPC ...... *G01B 11/2408* (2013.01); *G01B 11/0608* (2013.01)

(58) Field of Classification Search
CPC .................. G01B 11/2408; G01B 11/0608
USPC ................................... 356/600–640
See application file for complete search history.

(56) References Cited

U.S. PATENT DOCUMENTS

| 5,351,126 A * | 9/1994 | Takada | G01B 11/06 250/559.22 |
| 6,323,952 B1 * | 11/2001 | Yomoto | G01B 11/306 356/512 |
| 6,556,783 B1 * | 4/2003 | Gelphman | G03B 37/02 348/E5.042 |

(Continued)

FOREIGN PATENT DOCUMENTS

| CN | 101055172 | 10/2007 |
| CN | 102252637 | 11/2011 |

(Continued)

*Primary Examiner* — Tri T Ton (57) ABSTRACT

A surface flatness measuring device and a surface flatness measuring method are disclosed. By non-contacting laser measurement, measurement precision can reach 0.001 mm so the measurement precision is high. A repetitive measurement error thereof can be controlled to be within 3 um so the measurement error is tiny, which prevent issues of low measurement precision and great measurement errors due to manual measurement in prior art. At the same time, the present invention measurement data can be automatically recorded and saved, measurement for a large batch of boards under measurement can be implemented, which prevents the issues of the conventional measurement data requiring manual recording and lacking capability of uploading the measurement data.

10 Claims, 4 Drawing Sheets

(56) References Cited

U.S. PATENT DOCUMENTS

2007/0240322 A1   10/2007  Li et al.
2016/0320177 A1*  11/2016  Torngrena .............. G01B 11/24
2019/0346260 A1*  11/2019  Morita ................... G01B 11/26

FOREIGN PATENT DOCUMENTS

| CN | 102589488 | 7/2012 |
|----|-----------|--------|
| CN | 105716547 | 6/2016 |
| CN | 106813600 | 6/2017 |
| CN | 107063060 | 8/2017 |

\* cited by examiner

FIG. 6

SURFACE FLATNESS MEASURING DEVICE AND SURFACE FLATNESS MEASURING METHOD

RELATED APPLICATIONS

This application is a National Phase of PCT Patent Application No. PCT/CN2018/122620 having International filing date of Dec. 21, 2018, which claims the benefit of priority of Chinese Patent Application No. 201811395350.7 filed on Nov. 22, 2018. The contents of the above applications are all incorporated by reference as if fully set forth herein in their entirety.

FIELD AND BACKGROUND OF THE INVENTION

The present invention relates to fields of measurement technologies, especially to a surface flatness measuring device and a surface flatness measuring method.

For liquid crystal display (LCD) panel industries, during manufacture of a polarizer and a glass substrate, because pressures on top and bottom film layers are different, the polarizer and the glass substrate are liable to be curved, which affects the final quality of products. To ensure the quality of products, it is necessary to monitor surface flatness of the polarizer and the glass substrate and strictly control the surface flatness within a standard range. Nowadays, there are two main methods for measuring flatness in the industry, one is to measure with a thick gauge, and the other is to measure with a steel ruler.

Figure 1:
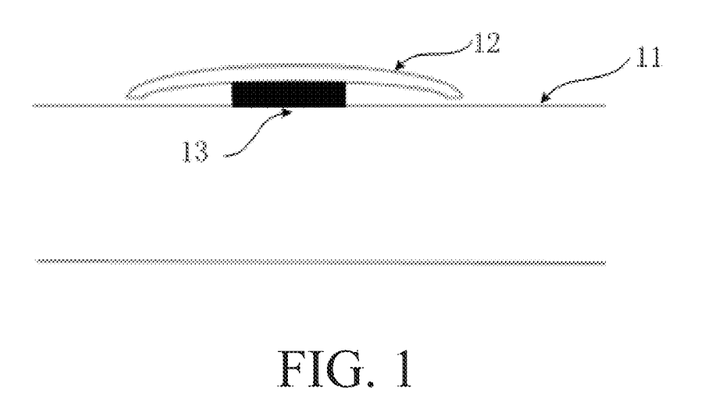
FIG. 1 is a schematic view of a measuring principle of a conventional method for measuring surface flatness with a thick gauge.

With reference to FIG. 1, FIG. 1 is a schematic view of a measuring principle of a conventional method for measuring surface flatness with a thick gauge. The measuring principle includes placing a glass substrate under measurement 12 on a marble platform 11 (a curved surface thereof faces down), inserting the thick gauge 13 into a gap 14 between the glass substrate under measurement 12 and the marble platform 11. If the thick gauge 13 can be inserted smoothly, a thicker thick gauge 13 will be inserted again until the thick gauge 13 cannot pass through the gap 14. A thickness of the thickest thick gauge 13 allowed to smoothly pass through the gap 14 is a surface flatness of the glass substrate under measurement 12. The principle of measuring surface flatness of the polarizer is the same as the abovementioned principle.

Figure 2:
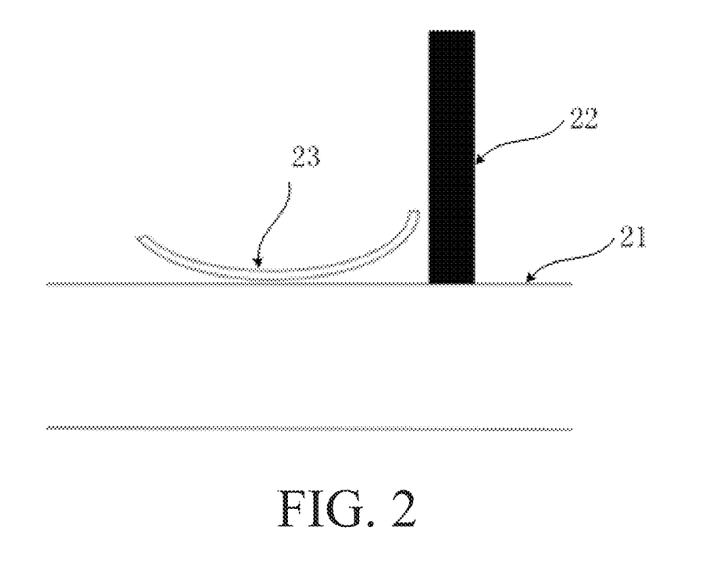
FIG. 2 is a schematic view of a measuring principle of a conventional method for measuring surface flatness with a steel ruler.

With reference to FIG. 2, FIG. 2 is a schematic view of a measuring principle of a conventional method for measuring surface flatness with a steel ruler. The measuring principle thereof includes placing a polarizer under measurement 22 on a marble platform 21 (a curved surface thereof faces up), measuring a height from a most seriously curved end of the polarizer under measurement 22 to the marble platform 21 by a steel ruler 23. The height measured is a surface flatness of the polarizer under measurement 22. A principle of measuring surface flatness of the glass substrate is the same as the above principle.

Such surface flatness measuring method employing the thick gauge or steel ruler has issues of lower measurement precision (about 0.1 mm), manual measurement, manual recording, great measurement error, and lack of capability of uploading measurement data.

SUMMARY OF THE INVENTION

An objective of the present invention is to provide a surface flatness measuring device and a surface flatness measuring method that can increase measurement precision, decrease measurement error, and simultaneously automatically record and save the measurement data by non-contacting laser measurement to solve the technical issue that measurement precision of low conventional surface flatness measurement, requirement of manual measuring and recording, high measurement error, and lack of capability of uploading measurement data.

To achieve the above objective, the present invention provides a surface flatness measuring device, the surface flatness measuring device includes: a measuring platform, configured to be placed with a board under measurement, a surface of the board under measurement marked with a plurality of points under measurement, wherein a number of the points under measurement is eight, first four of the points under measurement are distributed on the surface of the board under measurement near a periphery region, and last four of the points under measurement are distributed on the surface of the board under measurement near a center region; at least one laser head, configured to emit laser beams to one of the points under measurement and receive reflected light; a computer, configured to control the at least one laser head to move to different ones of the points under measurement and control the at least one laser head to emit laser beams to obtain height measurement values of all of the points under measurement, and the computer, further according to the points under measurement corresponding to first three of the obtained height measurement values, determining a datum plane, calculating out distance values each of which is between the datum plane and one of the points under measurement corresponding to remaining five of the height measurement values, and obtaining a maximum of the distance values to serve as a surface flatness measurement value of the board under measurement; and the computer further configured to record and save the surface flatness measurement value.

To achieve the above objective, the present invention also provides a surface flatness measuring device, the surface flatness measuring device includes: a measuring platform, configured to be placed with a board under measurement, and a surface of the board under measurement marked with a plurality of points under measurement; at least one laser head, configured to emit laser beams to one of the points under measurement and receive reflected light; a computer, configured to control the at least one laser head to move to different ones of the points under measurement and control the at least one laser head to emit laser beams to obtain height measurement values of all of the points under measurement, and the computer, further according to the points under measurement corresponding to three of the obtained height measurement values, determining a datum plane, calculating out distance values each of which is between the datum plane and one of the points under measurement corresponding to remains of the height measurement values, and obtaining a maximum of the distance values to serve as a surface flatness measurement value of the board under measurement.

To achieve the above objective, the present invention also provides a surface flatness measuring method, the surface flatness measuring method includes: step (1) placing a board under measurement on a measuring platform, wherein a surface off the board under measurement is marked with a plurality of points under measurement; step (2) by a computer, controlling a laser head to move to different ones of the points under measurement and controlling the laser head to emit laser beams to obtain height measurement values of all of the points under measurement; step (3) by the computer, according to the points under measurement corresponding to three of the obtained height measurement values, determining a datum plane, calculating out distance values each of which is between the datum plane and one of the points under measurement corresponding to remains of the height measurement values; and step (4) by the computer, obtaining a maximum of the distance values to serve as a surface flatness measurement value of the board under measurement.

Advantages of the present invention lies in that the present invention, by non-contacting laser measurement, can achieve measurement precision of 0.001 mm so the measurement precision is high, and repetitive measurement error thereof can be controlled to be within 3 um so the measurement error is tiny, which prevent issues of low measurement precision and great measurement error due to manual measurement in the prior art. At the same time, the present invention measurement data can be automatically recorded and saved, measurement for a large batch of boards under measurement can be implemented, which prevents the issues of the conventional measurement data requiring manual recording and lacking capability of uploading the measurement data.

BRIEF DESCRIPTION OF THE DRAWINGS

To more clearly explain the technical solutions in the embodiment of the present invention, the drawings used in the description of the embodiments will be briefly described below. Obviously, the drawings in the following description are only some implementations of the present invention. For example, a person of ordinary skill in the art can obtain other drawings according to these drawings without any creative work.

DESCRIPTION OF SPECIFIC EMBODIMENTS OF THE INVENTION

Embodiments of the present invention will be described in details. Examples of the embodiments are illustrated in the accompanying drawings. The same or similar reference characters refer to the same or similar elements or elements including the same or similar functions. The following embodiments described with reference to the accompanying drawings are exemplary, are only configured to construe the present invention and cannot be understood as limitations to the present invention.

In the present invention, it should be noted that unless clear rules and limitations otherwise exist, words "a first feature is "on" or "under" a second feature" can include a direct contact of the first and second features, can also include a contact of the first and second features through another feature therebetween instead of a direct contact. Furthermore, words "the first feature is "above" or "over" the second feature include that the first feature is right above or obliquely above the second feature, or only indicate that a level of the first feature is higher that of the second feature. Words "the first feature is "under" or "below" the second feature include that the first feature is right under or obliquely under the second feature, or only indicate that the level of the first feature is lower than that of the second feature.

The following disclosure provides many different embodiments or examples to achieve different structures of the present invention. To simplify the disclosure of the present invention, the components and arrangements of the specific examples are described below. Of course, they are merely examples, and the purpose is not to limit the present invention. Furthermore, the present invention may repeat reference numerals and/or reference letters in different examples. The repetition is for the purpose of simplification and clarity, and does not by itself indicate the relationship between the various embodiments and/or settings discussed. In addition, the present invention provides examples of various specific processes and materials, but a person of ordinary skill in the art can be aware of the application of other processes and/or the use of other materials.

The present invention mainly innovates in the measuring principle, solves issues of difficulty and technology defects of the conventional flatness measurement, calculates out a height difference between different regions of the board under measurement by optical path differences from laser head to the board under measurement, and by a fitting plane, calculates out a maximum distance among distances from points under measurement on the board under measurement to the fitting plane such that a surface flatness of the board under measurement is obtained.

Figure 3:
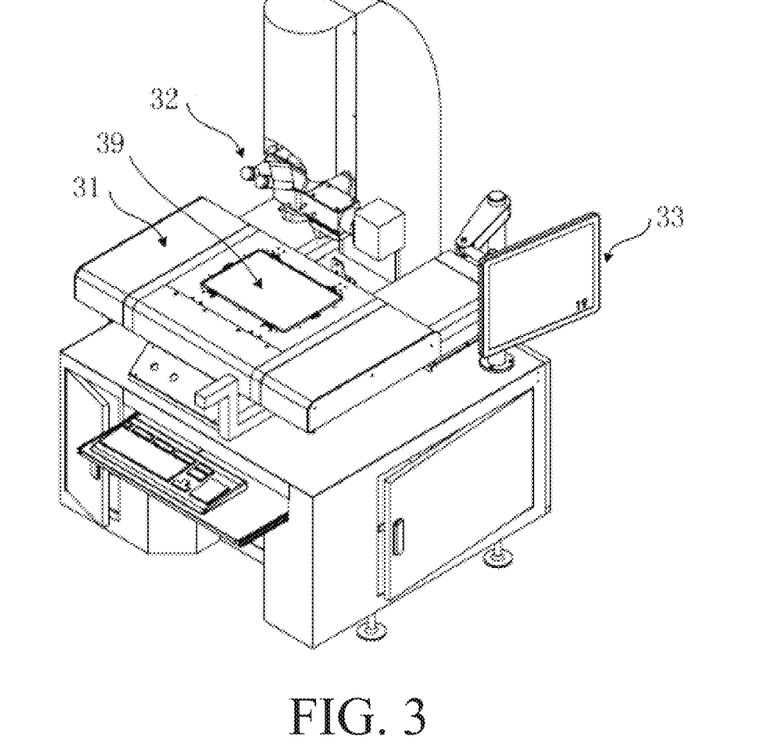
FIG. 3 is a perspective view of the surface flatness measuring device of the present invention.

With reference to FIG. 3, FIG. 3 is a perspective view of the surface flatness measuring device of the present invention. The surface flatness measuring device includes a measuring platform 31, at least one laser head 32, and a computer 33.

The measuring platform 31 is a platform for bearing an object under measurement, and is configured to be placed with a board under measurement 39. A surface of the board under measurement 39 is marked with a plurality of points under measurement. The board under measurement 39 can be an assembly of a liquid crystal display (LCD) panel, such as a glass substrate or a polarizer needing measurement of the surface flatness.

The at least one laser head 32 is configured to emit laser beams to one of the points under measurement and receive reflected light. The at least one laser head 32 is moved at predetermined intervals for several times to implement repeated measurements such that all measurements of the points under measurement are completed. Preferably, the surface flatness measuring device can also include a plurality of laser heads, and the laser heads correspond to the points under measurement. All of the laser heads 32 simultaneously emit laser beams to corresponding points under measurement respectively and receive reflected light respectively such that all measurements of the points under measurement can be completed by a single measuring step.

The computer 33 is configured to control the laser heads 32 to move to different ones of the points under measurement and control the laser heads 32 to emit laser beams to obtain height measurement values $H_1$-$H_n$ of all of the points under measurement. The computer 33, further according to the points under measurement corresponding to three of all of the obtained height measurement values $H_1$-$H_n$, determines a datum plane S0, calculates out distance values each of which is between the datum plane S0 and one of the points under measurement corresponding to remaining five of the height measurement values H1-Hn, and obtains a maximum h of the distance values to serve as a surface flatness measurement value of the board under measurement 39.

That is, the computer 33 includes a central process unit (CPU), the computer 33 can receive externally inputted control instructions, control the laser heads 32 to move at the predetermined intervals to different ones of the points under measurement. The computer 33, by obtaining optical path differences from the laser heads 32 to the points under measurement, calculates out the height measurement values of the points under measurement in the CPU. The computer 33 further determines a datum plane S0 in the CPU by three height measurement values of all of the obtained height measurement values H1-Hn, and calculates out distance values each of which is between the datum plane S0 and one of the points under measurement corresponding to remains of the height measurement values. A maximum h of all of the distance values is a surface flatness of the board under measurement 39.

Preferably, the computer 33 is further configured to record and save the obtained surface flatness measurement value of the board under measurement. For instance, the obtained surface flatness measurement value of the board under measurement is saved in a public archive area.

The present invention, by optical paths from the laser head to the board under measurement, a difference in height between different regions of the board under measurement, and by a fitting plane, calculates out a maximum distance among distances from points under measurement on the board to the fitting plane such that a surface flatness of the board under measurement is obtained. The present invention, by non-contacting laser measurement, can achieve measurement precision of 0.001 mm so the measurement precision is high, and a repetitive measurement error thereof can be controlled to be within 3 um so the measurement error is tiny, which prevent issues of low measurement precision and great measurement errors due to manual measurement in prior art. At the same time, the present invention measurement data can be automatically recorded and saved, measurement for a large batch of boards under measurement can be implemented, which prevents the issues of the conventional measurement data requiring manual recording and lacking capability of uploading the measurement data.

Figure 4:
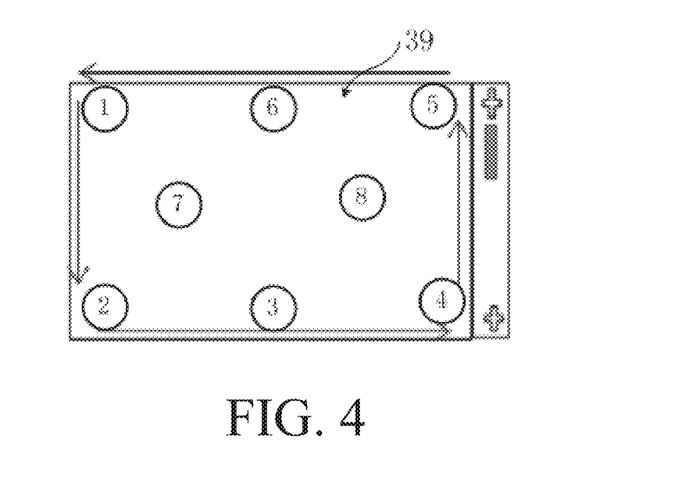
FIG. 4 is a schematic view of a surface of a board under measurement of the present invention marked with points under measurement.
Figure 5:
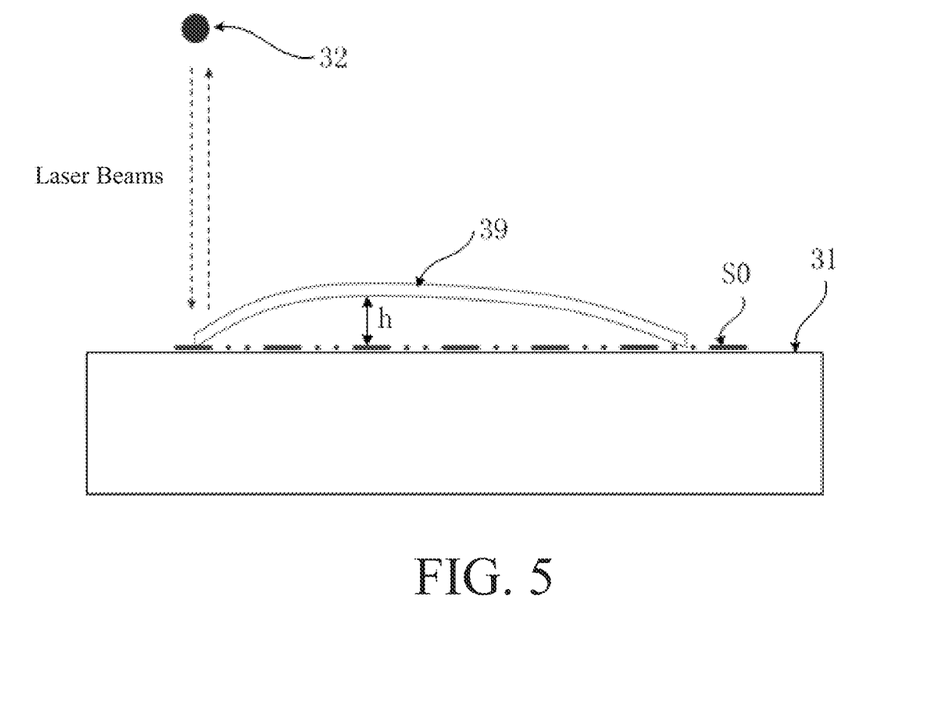
FIG. 5 is a schematic view of a surface flatness measuring principle of the present invention.

With reference to FIGS. 4 to 5, FIG. 4 is a schematic view of a surface of the board under measurement of the present invention marked with points under measurement. FIG. 5 is a schematic view of a surface flatness measuring principle of the present invention. In the present embodiment, a number of the points under measurement is eight (reference numerals 1-8 in the figures, wherein an arrow indicates sequence of measurement), first four of the points under measurement 1, 2, 3, 4 are distributed on the surface of the board under measurement 39 near a periphery region. Last four of the points under measurement 5, 6, 7, 8 are distributed on the surface of the board under measurement 39 near a central region. The computer 33, further according to the points under measurement 1, 2, 3 corresponding to first three of the height measurement values of all of the obtained height measurement values, determines a datum plane S0, then calculates out distance values each of which is between the datum plane S0 and one of the points under measurement 4, 5, 6, 7, 8 corresponding to remaining five of the height measurement values, and then obtains a maximum h of the distance values to serve as a surface flatness measurement value of the board under measurement 39.

The following describes the process of the flatness measuring method of the present invention by taking the surface flatness of the glass substrate as an example.

Step 1: placing a glass substrate under measurement on the measuring platform 31 of the surface flatness measuring device;

Step 2: activating the computer 33, controlling the laser heads 32 to emit laser beams to a surface of the glass substrate, receive reflected light, and obtain a height measurement value of a first point of the glass substrate;

Step 3: repeatedly measuring heights of different places on the glass substrate by the laser beams with the measurement implemented for total eight points, and obtaining height measurement values of the eight points;

Step 4: determining a datum plane S0 by the height measurement values of first three of the points, calculating out distance values each of which is between the datum plane S0 and one of last five of the points.

Step 5: obtaining a maximum of the distance values, wherein the maximum is a surface flatness measurement value of the glass substrate under measurement; and saving the measurement value to a public archive area.

Figure 6:
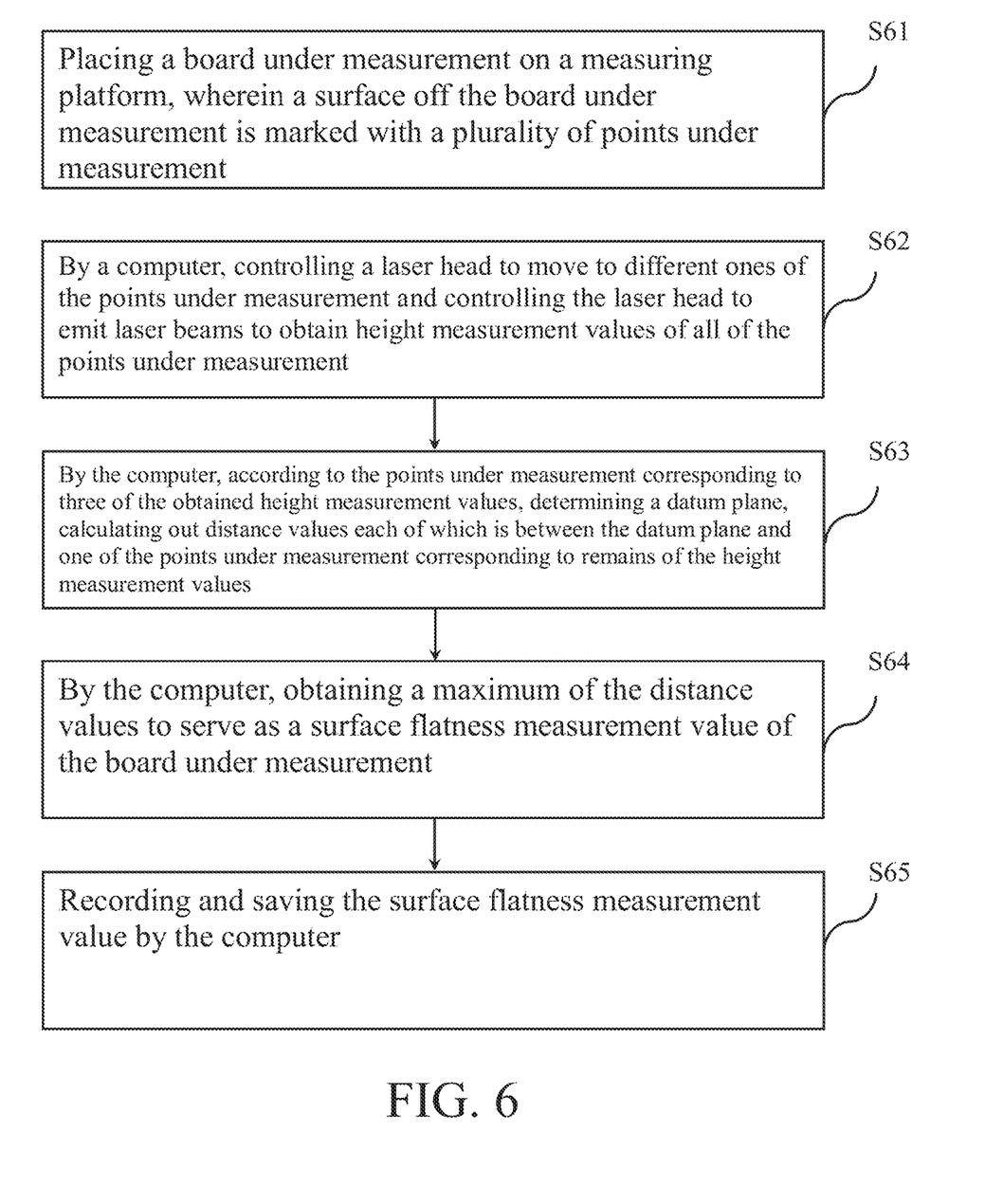
FIG. 6 is a flowchart of a surface flatness measuring method of the present invention.

With reference to FIG. 6, FIG. 6 is a flowchart of a surface flatness measuring method of the present invention. The surface flatness measuring method includes Step S61: placing a board under measurement on a measuring platform, wherein a surface off the board under measurement is marked with a plurality of points under measurement; Step S62: by a computer, controlling a laser head to move to different ones of the points under measurement and controlling the laser head to emit laser beams to obtain height measurement values of all of the points under measurement; Step S63: by the computer, according to the points under measurement corresponding to three of the obtained height measurement values, determining a datum plane and calculating distance values each of which is between the datum plane and one of the points under measurement corresponding to remains of the height measurement values; and Step S64: by the computer, obtaining a maximum of the distance values to serve as a surface flatness measurement value of the board under measurement.

Specifically, by the computer, obtaining optical path differences from the laser head to the points under measurement, and calculating out the height measurement values of the points under measurement. In the present embodiment, the at least one laser head is moved at predetermined intervals for several times to implement repeated measurements such that all measurements of the points under measurement are completed. In another embodiment, a plurality of the laser heads can be disposed, and the laser heads correspond to the points under measurement. All of the laser heads simultaneously emit laser beams to corresponding points under measurement respectively and receive reflected light respectively such that all measurements of the points under measurement can be completed by a single measuring step. Specifically, the step S62 further includes by the computer, controlling a plurality of the laser heads to emit laser beams to the points under measurement to obtain the measurement values of height of all of the points under measurement.

Preferably, a number of the points under measurement is eight, first four of the points under measurement are distributed on the surface of the board under measurement near a periphery region, and last four of the points under measurement are distributed on the surface of the board under measurement near a central region (as shown in FIG. 4). Accordingly, the step S63 further includes by the computer, according to the points under measurement corresponding to first three of the obtained height measurement values, determining a datum plane, calculating out distance values each of which is between the datum plane and one of the points under measurement corresponding to remaining five of the height measurement values, and obtaining a maximum of the distance values to serve as the surface flatness measurement value.

Preferably, the surface flatness measuring method further includes Step S65: recording and saving the surface flatness measurement value by the computer. For instance, the obtained surface flatness measurement value of the board under measurement is saved in a public archive area.

The present invention, by non-contacting laser measurement, can achieve measurement precision of 0.001 mm so the measurement precision is high, and a repetitive measurement error thereof can be controlled to be within 3 um so the measurement error is tiny, which prevent issues of low measurement precision and great measurement error due to manual measurement in prior art. At the same time, the present invention measurement data can be automatically recorded and saved, measurement for a large batch of boards under measurement can be implemented, which prevents the issues of the conventional measurement data requiring manual recording and lacking capability of uploading the measurement data.

INDUSTRIAL APPLICABILITY

The subject matter of the present invention can be manufactured and used in industry, and has industrial applicability.

What is claimed is:

1. A surface flatness measuring device, wherein the surface flatness measuring device comprises:
   a measuring platform, configured to be placed with a board under measurement, a surface of the board under measurement marked with a plurality of points under measurement, wherein a number of the points under measurement is eight, first four of the points under measurement are distributed on the surface of the board under measurement near a periphery region, and last four of the points under measurement are distributed on the surface of the board under measurement near a central region;
   at least one laser head, configured to emit laser beams to one of the points under measurement and receive reflected light;
   a computer, configured to control the at least one laser head to move to different ones of the points under measurement and control the at least one laser head to emit laser beams to obtain height measurement values of all of the points under measurement, and the computer, further according to the points under measurement corresponding to first three of the obtained height measurement values, determining a datum plane, calculating out distance values each of which is between the datum plane and one of the points under measurement corresponding to remaining five of the height measurement values, and obtaining a maximum of the distance values to serve as a surface flatness measurement value of the board under measurement; and
   the computer further configured to record and save the surface flatness measurement value.

2. The surface flatness measuring device as claimed in claim 1, wherein the surface flatness measuring device further comprises a plurality of the laser heads, the laser heads correspond to the points under measurement, and all of the laser heads are configured to emit laser beams to corresponding ones of the points under measurement and receive reflected light.

3. A surface flatness measuring device, wherein the surface flatness measuring device comprises:
   a measuring platform, configured to be placed with a board under measurement, and a surface of the board under measurement marked with a plurality of points under measurement;
   at least one laser head, configured to emit laser beams to one of the points under measurement and receive reflected light;
   a computer, configured to control the at least one laser head to move to different ones of the points under measurement and control the at least one laser head to emit laser beams to obtain height measurement values of all of the points under measurement, and the computer, further according to the points under measurement corresponding to three of the obtained height measurement values, determining a datum plane, calculating out distance values each of which is between the datum plane and one of the points under measurement corresponding to remains of the height measurement values, and obtaining a maximum of the distance values to serve as a surface flatness measurement value of the board under measurement;
   wherein a number of the points under measurement is eight, first four of the points under measurement are distributed on the surface of the board under measurement near a periphery region, and last four of the points under measurement are distributed on the surface of the board under measurement near a center region.

4. The surface flatness measuring device as claimed in claim 3, wherein the surface flatness measuring device further comprises a plurality of laser heads, the laser heads correspond to the points under measurement, and all of the laser heads are configured to emit laser beams to corresponding ones of the points under measurement and receive reflected light.

5. The surface flatness measuring device as claimed in claim 3, wherein the computer, further according to the points under measurement corresponding to first three of the obtained height measurement values, determines a datum plane, calculates out distance values each of which is between the datum plane and one of the points under measurement corresponding to remaining five of the height measurement values, and obtains a maximum of the distance values to serve as the surface flatness measurement value.

6. The surface flatness measuring device as claimed in claim 3, wherein the computer is further configured to record and save the surface flatness measurement value.

7. A surface flatness measuring method, wherein the surface flatness measuring method comprises:
   Step (1), placing a board under measurement on a measuring platform, wherein a surface off the board under measurement is marked with a plurality of points under measurement;
   Step (2), by a computer, controlling a laser head to move to different ones of the points under measurement and controlling the laser head to emit laser beams to obtain height measurement values of all of the points under measurement;

Step (3), by the computer, according to the points under measurement corresponding to three of the obtained height measurement values, determining a datum plane, calculating out distance values each of which is between the datum plane and one of the points under measurement corresponding to remains of the height measurement values; and Step (4), by the computer, obtaining a maximum of the distance values to serve as a surface flatness measurement value of the board under measurement;

wherein a number of the points under measurement is eight, first four of the points under measurement are distributed on the surface of the board under measurement near a periphery region, and last four of the points under measurement are distributed on the surface of the board under measurement near a central region; the Step (3) further comprises by the computer, according to the points under measurement corresponding to first three of the obtained height measurement values, determining a datum plane, calculating out distance values each of which is between the datum plane and one of the points under measurement corresponding to remaining five of the height measurement values, and obtaining a maximum of the distance values to serve as the surface flatness measurement value.

8. The surface flatness measuring method as claimed in claim 7, wherein Step (2) further comprises:
by the computer, controlling a plurality of the laser heads to emit laser beams to the points under measurement to obtain the height measurement values of all of the points under measurement.

9. The surface flatness measuring method as claimed in claim 7, wherein Step (2) further comprises by the computer, obtaining optical path differences from the laser head to the points under measurement, and calculating out the height measurement values of the points under measurement.

10. The surface flatness measuring method as claimed in claim 7, wherein the surface flatness measuring method further comprises:
Step (5), recording and saving the surface flatness measurement value by the computer.

* * * * *